US011416606B2

(12) United States Patent
Thakur et al.

(10) Patent No.: US 11,416,606 B2
(45) Date of Patent: Aug. 16, 2022

(54) AGENT PRESENCE FOR SELF-HEALING

(71) Applicant: Musarubra US LLC, Plano, TX (US)

(72) Inventors: Shashin Thakur, Ahmedabad (IN); Arvind K. Boggarapu, Benagaluru (IN); Harvir Singh, Portland, OR (US)

(73) Assignee: Musarubra US LLC, Plano, TX (US)

( * ) Notice: Subject to any disclaimer, the term of this patent is extended or adjusted under 35 U.S.C. 154(b) by 119 days.

(21) Appl. No.: 15/513,783

(22) PCT Filed: Dec. 27, 2014

(86) PCT No.: PCT/US2014/072455
§ 371 (c)(1),
(2) Date: Mar. 23, 2017

(87) PCT Pub. No.: WO2016/064433
PCT Pub. Date: Apr. 28, 2016

(65) Prior Publication Data
US 2017/0316204 A1    Nov. 2, 2017

(30) Foreign Application Priority Data
Oct. 24, 2014    (IN) .......................... 5294/CHE/2014

(51) Int. Cl.
*G06F 21/55*    (2013.01)
*G06F 21/57*    (2013.01)
(Continued)

(52) U.S. Cl.
CPC ........... *G06F 21/554* (2013.01); *G06F 21/55* (2013.01); *G06F 21/552* (2013.01); *G06F 21/566* (2013.01); *G06F 21/575* (2013.01); *G06F 21/577* (2013.01); *H04L 63/1408* (2013.01); *H04L 63/1416* (2013.01);
(Continued)

(58) Field of Classification Search
None
See application file for complete search history.

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| CN | 113221102 A | 8/2021 |
| WO | 2002087152 A1 | 10/2002 |

OTHER PUBLICATIONS

Extended European Search Report issued in EP 14904361.4 dated Feb. 6, 2018; 7 pages.

(Continued)

*Primary Examiner* — Arezoo Sherkat
(74) *Attorney, Agent, or Firm* — Patent Capital Group

(57) ABSTRACT

In one or more examples, there is disclosed a system and method of detecting agent presence for self-healing. An out-of-band monitoring process, such as Intel® AMT, or any process in firmware executing on a co-processor, may monitor one or more processes to determine if one goes down or otherwise meets a security criterion. Crashed processes may be reported to an enterprise security controller (ESC). The ESC may notice trends among affected machines and instruct the machines to take appropriate remedial action, such as booting from a remedial image.

23 Claims, 4 Drawing Sheets

(51) Int. Cl.
*G06F 21/56* (2013.01)
*H04L 9/40* (2022.01)

(52) U.S. Cl.
CPC ...... *H04L 63/1425* (2013.01); *H04L 63/1441* (2013.01); *H04L 63/1458* (2013.01); *H04L 63/20* (2013.01)

(56) References Cited

U.S. PATENT DOCUMENTS

| | | | |
|---|---|---|---|
| 6,460,050 B1 | 10/2002 | Pace et al. | |
| 7,506,155 B1 | 3/2009 | Stewart et al. | |
| 8,099,784 B1* | 1/2012 | Chen | G06F 21/554 726/23 |
| 9,195,806 B1* | 11/2015 | Robinson | G06F 12/1408 |
| 2002/0138753 A1 | 9/2002 | Munson | |
| 2003/0005037 A1* | 1/2003 | Aija | G06F 8/61 709/203 |
| 2004/0003286 A1 | 1/2004 | Kaler et al. | |
| 2005/0235054 A1* | 10/2005 | Kadashevich | G06F 9/5016 709/223 |
| 2005/0235284 A1* | 10/2005 | Kadashevich | G06F 11/3419 718/100 |
| 2006/0020924 A1* | 1/2006 | Lo | G06F 11/3466 717/127 |
| 2006/0143530 A1* | 6/2006 | Largman | G06F 11/1417 714/36 |
| 2006/0253745 A1 | 11/2006 | Maso et al. | |
| 2007/0006307 A1* | 1/2007 | Hahn | G06F 11/0757 726/22 |
| 2007/0180119 A1* | 8/2007 | Khivesara | H04L 47/828 709/226 |
| 2008/0155509 A1* | 6/2008 | Ohta | G06F 21/572 717/127 |
| 2010/0037321 A1* | 2/2010 | Oz | G06F 21/57 726/24 |
| 2010/0107246 A1* | 4/2010 | Ohta | G06F 21/575 726/22 |
| 2010/0251369 A1 | 9/2010 | Grant | |
| 2011/0126111 A1 | 5/2011 | Gill et al. | |
| 2011/0214157 A1* | 9/2011 | Korsunsky | H04L 63/20 726/1 |
| 2011/0231510 A1* | 9/2011 | Korsunsky | G06F 21/55 709/213 |
| 2012/0159256 A1* | 6/2012 | Havewala | G06F 11/0793 714/37 |
| 2012/0240185 A1* | 9/2012 | Kapoor | H04L 63/1425 726/1 |
| 2013/0104236 A1* | 4/2013 | Ray | H04L 63/1408 726/25 |
| 2013/0211762 A1* | 8/2013 | Taskov | G06F 11/073 702/88 |
| 2013/0247166 A1 | 9/2013 | Freedman et al. | |
| 2014/0378091 A1* | 12/2014 | Irwin | H04M 15/58 455/405 |
| 2015/0172300 A1* | 6/2015 | Cochenour | H04L 63/145 726/23 |

OTHER PUBLICATIONS

International Preliminary Report on Patentability issued in International Application No. PCT/US2014/072455 dated Apr. 25, 2017; 9 pages.
International Search Report and Written Opinion issued in PCT Application No. PCT/2014/072455 dated Jul. 7, 2015.
Chinese Notice of Allowance issued in CN Application No. 201480082168.X dated Feb. 1, 2021; 4 pages (with English translation).

* cited by examiner

AGENT PRESENCE FOR SELF-HEALING

CROSS-REFERENCE TO RELATED APPLICATIONS

This Application is a national stage application under 35 U.S.C. § 371 of PCT Application PCT/US2014/072455, filed on Dec. 27, 2014 and entitled "Agent Presence for Self-Healing" which claims priority to an Indian Provisional Patent Application Serial No. 5294/CHE/2014, filed Oct. 10, 2014, and entitled "Agent Presence for Self-Healing". The disclosure of the prior applications are considered part of and are hereby incorporated by reference in their entirety in the disclosure of this application.

FIELD OF THE DISCLOSURE

This application relates to the field of computer security, and more particularly to a system and method of detecting agent presence for self-healing.

BACKGROUND

An infected/malfunctioning system in an enterprise may require manual assistance and troubleshooting to fix its issues. Sometime, if a system is infected with a virus or other malicious application, it may become the source or victim of outbreaks. Thus, the system may need to be manually remedied, which can be costly and time-consuming. Furthermore, while the machine is awaiting remediation, it may infect other machines.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
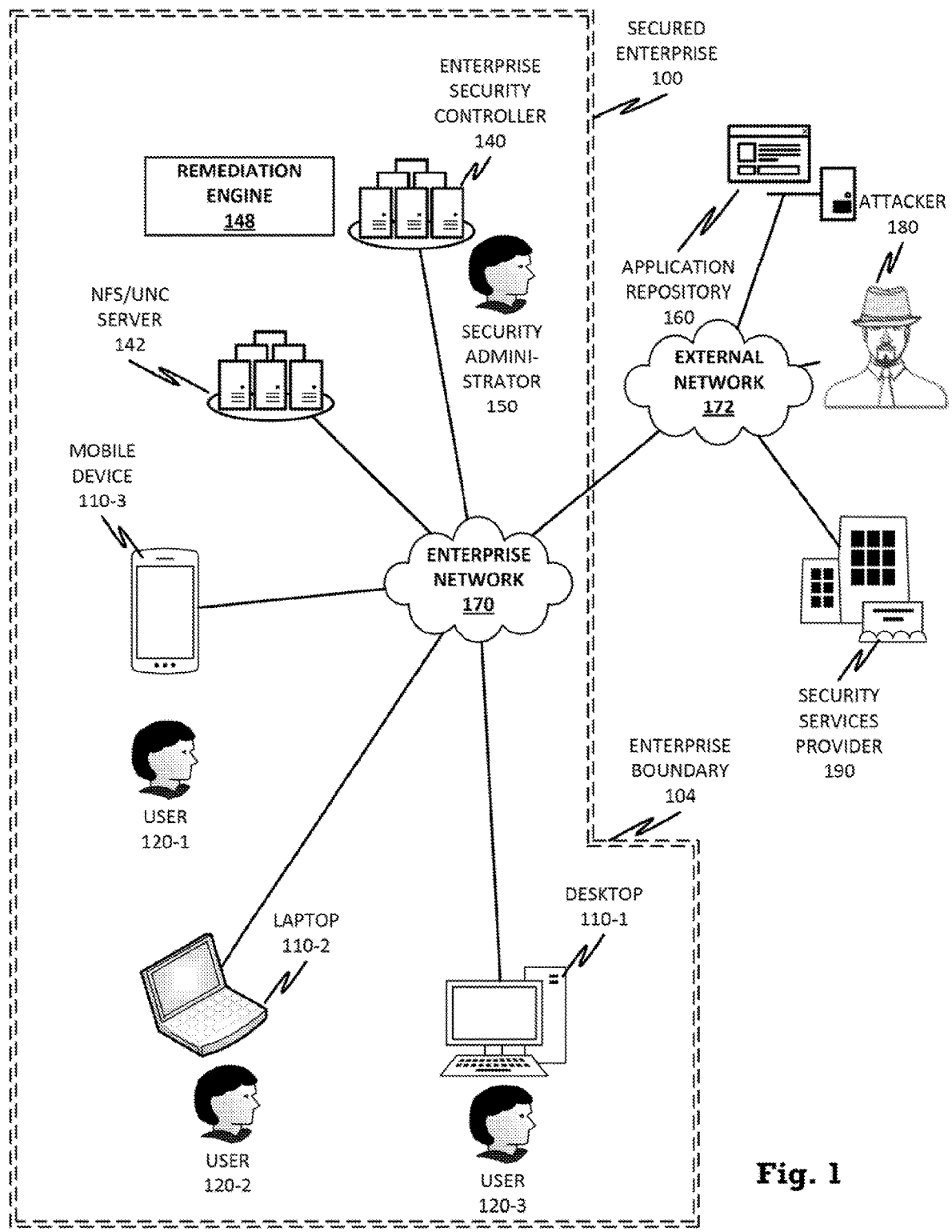
FIG. 1 is a block diagram of a network according to one or more examples of the present Specification.

In one or more examples, there is disclosed a system and method of detecting agent presence for self-healing. An out-of-band monitoring process, such as Intel® AMT, or any process in firmware executing on a co-processor, may monitor one or more processes to determine if one goes down or otherwise meets a security criterion. Crashed processes may be reported to an enterprise security controller (ESC). The ESC may notice trends among affected machines and instruct the machines to take appropriate remedial action, such as booting from a remedial image.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In the ever-evolving arms race between security experts and end-users on the one hand, and malware authors on the other hand, a useful technique for malicious actors is to identify within memory an antivirus engine, anti-malware engine, or other system management agent and attempt to disable, uninstall, corrupt, or otherwise compromise it. If software protecting the device can be disabled, then the malware can execute with impunity. In some cases, malware objects may even launch a monitoring process that continually watches for the antivirus agent to come back up, and kills the process again if it does. It may also try to block antivirus updates, and otherwise interfere with any attempt to launch remedial processes that deal with the malware object.

When a user becomes aware of such underhanded dealings on his machine, his only practical recourse may be to notify enterprise security personnel, so that they can then manually quarantine the machine, and perform remediation. Such processes can be costly and cumbersome.

However, it is recognized in the present Specification that interference with a system management agent or other critical process may itself be a reliable indicator of the presence of malware, if not in the individual case, at least in the aggregate across several machines. Thus, if the system can be monitored, and attempts to disable or otherwise obstruct critical processes are detected, automated remediation can be initiated from a server.

It should be noted, however, that a malware attack is not the exclusive reason that a critical process may encounter errors or problems. For example, critical application may crash because of page faults, memory errors, hardware failures, ordinary bugs, or malformed inputs to name just a few nonlimiting examples. Thus, it may be difficult to detect malware on an individual machine simply by monitoring critical processes. However, if an ESC monitors many machines, and detects a similar malfunction on several machines in a short time, this may be a reliable indicator that something is amiss.

According to the present Specification, a security administrator may define a security policy, including defining a list of one or more critical applications that should be monitored by an out-of-band management agent. If the out-of-band management agent detects a security event related to any of the monitored applications, it may report the event to an ESC. If the ESC determines that the event is likely caused by malware, it may provide instructions to the out-of-band management agent, such as instructing it to retrieve a remediation image from a network share and reboot the machine with the remediation image. The remediation image may contain up-to-date virus definitions, and may have utilities to scan the hard disk and remove malware objects.

Out-of-band monitoring may be provided in one example, by Intel® vPro™ or a similar secure co-processor and associated firmware. Throughout this Specification, an outof-band management agent is intended to include a Vpro™ co-processor, or any similar or equivalent hardware, software, and/or firmware capable of out-of-band monitoring of system applications. In certain embodiments, out-of-band monitoring may take place within a trusted execution environment (TEE). The out-of-band management engine may monitor all processes on a configured list, and immediately report to an enterprise security controller if any of the processes crashes or otherwise encounters errors.

Although the out-of-band management agent may not be able to determine by itself the cause of a crash of a critical system, the enterprise security controller may be able to aggregate relevant and useful information to determine, for example, that a malware outbreak has occurred. For example, if a large number of hosts suddenly and near simultaneously lose their antivirus agents, then the enterprise security controller may determine that a malware outbreak is probably underway, and take appropriate remedial action.

Decision-making at the enterprise security controller may be streamlined by detecting multiple instances of near simultaneous crashes of the same monitored agent. For example, it may be considered relatively normal for an antivirus agent on a single machine to occasionally crash due to some error. However, a near-simultaneous crash of antivirus engines on two different machines should be much rarer. A near-simultaneous crash of three or more machines may indicate with a high degree of confidence that malware activity is going on.

Once it is determined to an appropriate level of confidence that one or more machines are probably suffering a malware outbreak, appropriate remedial action may be taken. For example, the machines may be placed in a system defense mode, where their activities on the network are extremely limited. They may also be placed temporarily in a protected subnetwork that does not have access to enterprise computing resources, so that the outbreak can be quickly prevented from further spreading. Once a host has been placed in system defense mode, it may be limited to only a few activities, such as contacting a remediation server to download a remediation image.

In certain embodiments, Intel® vPro™ provides ("out of the box") a feature called "agent presence," which can be configured to monitor a particular process, and report to an enterprise security controller if that process goes down.

A system and method for remediation via detection of agent presence will now be described with more particular reference to the appended FIGURES.

FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for an awesome security administrator 150 to define enterprise security policies, which ESC 140 may enforce on enterprise network 170 and across client devices 120. In one non-limiting example, ESC 140 may be, or may include, a McAfee® ePolicyOrchestrator (ePO) security appliance.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device 200. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

When enterprise security server 140 detects a potential compromise of one or more client devices 110, it may take appropriate action, such as remediation. In one example, remediation comprises instructing an out of band management engine to boot client device 110 from a remediation image 148. Remediation image 148 may be stored on an NFS or UNC server 142 to provide network boot capability. Remediation image 148 may include up-to-date virus definitions for scanning and cleaning a system. In some cases, security services provider 190 may provide regular updates, and enterprise security controller 140 may keep the remediation image 148 up-to-date. In other cases, security services provider 190 may keep remediation image 148 up-to-date, and may deliver copies of the latest remediation image on-demand via external network 172. In yet another example, enterprise security controller 140 may regularly deliver a lightweight and up-to-date remediation engine to an out-of-band management engine of client devices 110, and upon a command from enterprise security controller 140, client devices 110 may boot from the local copy of the remediation image.

In one example, each client device 110 includes an out of band management engine, which may run in firmware or in a protected hardware space so that it cannot be compromised by PUC. The out of band management engine may monitor one or more specific processes and report, for example, if one or more processes suddenly crashes. While a single process crashing may not be enough for client device 110 to deem the event suspicious, at least in certain embodiments, enterprise security server 140 may notice that the same process has crashed for a large number of client devices 110 in a short period of time. This may be an indication of suspicious activity. Enterprise security server 140 may then take appropriate action, such as quarantining the individual client devices 110, the subnet containing those devices, or the entire network. In one example, enterprise security server 140 leaves open a single port so that it can perform remediation action.

Figure 2:
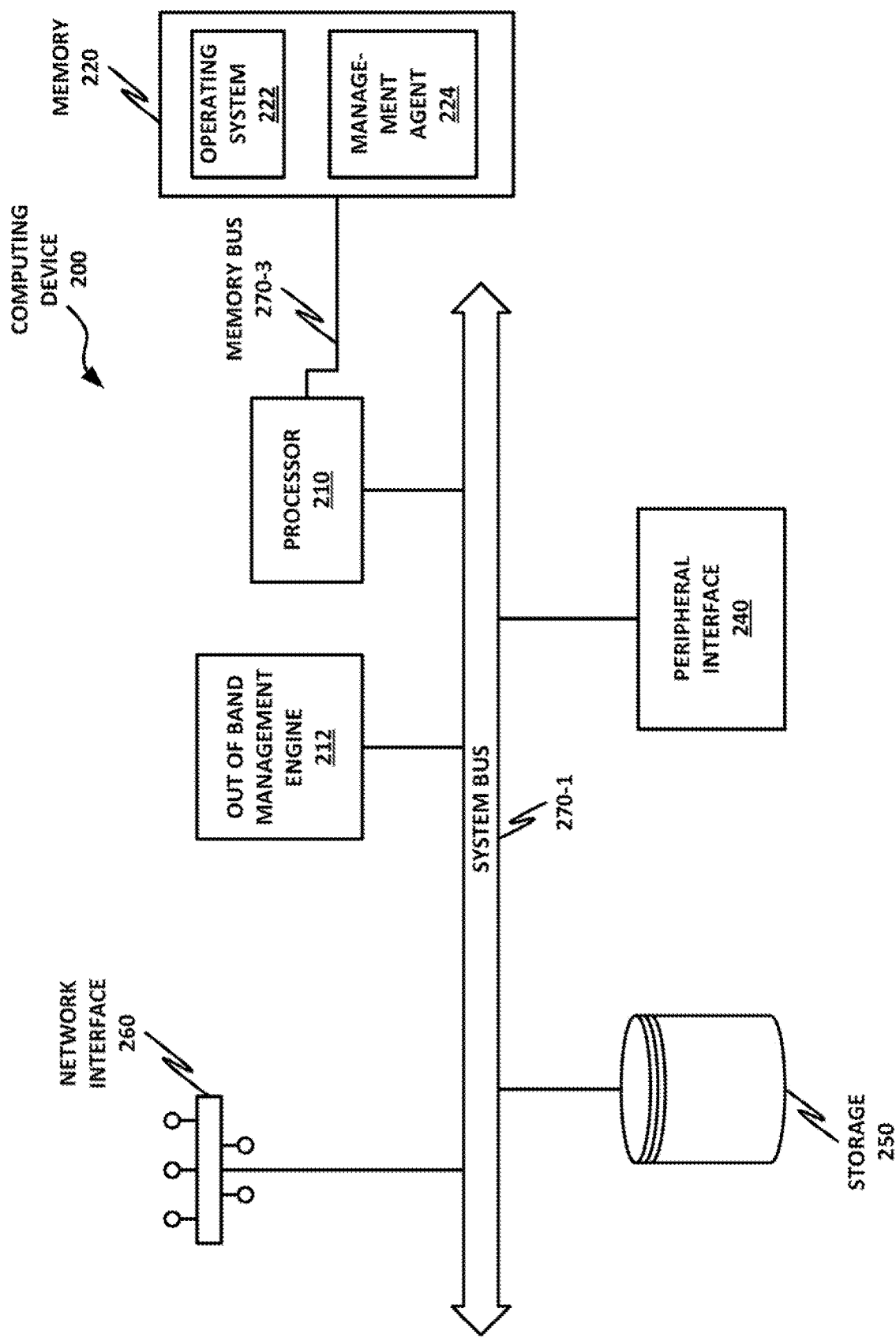
FIG. 2 is a block diagram of a client device to one or more examples of the present Specification.

FIG. 2 is a block diagram of a computing device 200 according to one or more examples of the present Specification. Computing device 200 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In certain embodiments, client devices 110 may all be examples of computing devices 200.

Computing device 200 includes a processor 210 connected to a memory 220, having stored therein executable instructions for providing an operating system 222 and at least software portions of a management agent 224. Other components of computing device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of management agent 224. Many other configurations are also possible, and are intended to be encompassed within the broad scope of this Specification.

Network interface 260 may be provided to communicatively couple computing device 200 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Management agent 224, in one example, is operable to carry out computer-implemented methods as described in this Specification. Management agent 224 may include one or more non-transitory computer-readable mediums having stored thereon executable instructions operable to instruct a processor to provide a security engine. As used throughout this Specification, an "engine" includes any combination of one or more logic elements, of similar or dissimilar species, operable for and configured to perform one or more methods provided by management agent 224. Thus, management agent 224 may comprise one or more logic elements configured to provide methods as disclosed in this Specification. In some cases, management agent 224 may include a special integrated circuit designed to carry out a method or a part thereof, and may also include software instructions operable to instruct a processor to perform the method. In some cases, management agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that management agent 224 may also include other hardware and software, including configuration files, registry entries, and interactive or user-mode software by way of non-limiting example.

In one example, management agent 224 includes executable instructions stored on a non-transitory medium operable to perform a method according to this Specification. At an appropriate time, such as upon booting computing device 200 or upon a command from operating system 222 or a user 120, processor 210 may retrieve a copy of management agent 224 (or software portions thereof) from storage 250 and load it into memory 220. Processor 210 may then iteratively execute the instructions of management agent 224 to provide the desired method.

Malware objects may, in some cases, deliberately and specifically target management agent 224, with the specific intent of crashing or otherwise disabling management agent 224. Thus, a crash of management agent 224 may be indicative of a possible infection.

Out of band management engine 212 may be provided in firmware, in a co-processor, in a trusted execution environment (TEE) or in a secure memory area to harden it against interference by malware objects. Out of band management engine 212 may be configured to monitor computing device 200 and to report certain classes of incidents to enterprise security server 140. In one nonlimiting example, out of band management engine 212 may be or include an Intel® VPRO co-processor and firmware provisioned with active management technology (AMT), including an "agent presence" feature. The VPRO agent presence feature is a configurable list of resident programs that VPRO can monitor, and notify ESC 140 if any of the processes crashes or ceases to function.

Peripheral interface 240 may be configured to interface with any auxiliary device that connects to computing device 200 but that is not necessarily a part of the core architecture of computing device 200. A peripheral may be operable to provide extended functionality to computing device 200, and may or may not be wholly dependent on computing device 200. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
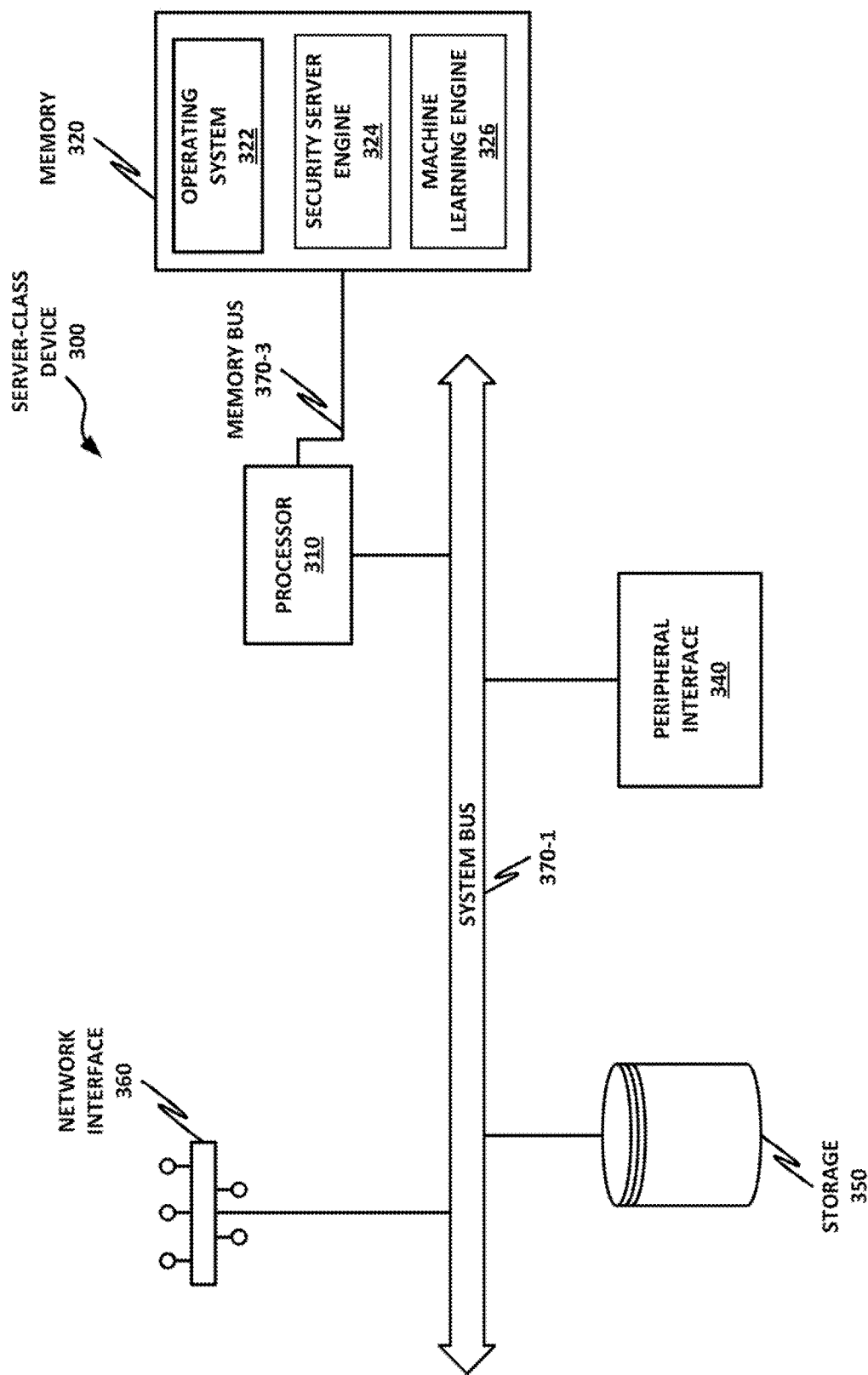
FIG. 3 is a block diagram of a server device to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise. Server 140 is described herein separately to illustrate that in certain embodiments, logical operations according to this Specification may be divided along a client-server model, wherein computing device 200 provides certain localized tasks, while server 140 provides certain other centralized tasks.

Server 140 includes a processor 310 connected to a memory 320, having stored therein executable instructions for providing an operating system 322 and at least software portions of a security server engine 324. Other components of server 140 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of security server engine 324.

Network interface 360 may be provided to communicatively couple server 140 to a wired or wireless network, and may include one or more logic elements as described in FIG. 2.

Security server engine 324 is an engine as described in FIG. 2 and, in one example, includes one or more logic elements operable to carry out computer-implemented methods as described in this Specification. Software portions of security server engine 324 may run as a daemon process.

Security server engine 324 may include one or more non-transitory computer-readable mediums having stored thereon executable instructions operable to instruct a processor to provide a security engine. At an appropriate time, such as upon booting server 140 or upon a command from operating system 222 or a user 120 or security administrator 150, processor 310 may retrieve a copy of security server engine 324 (or software portions thereof) from storage 350 and load it into memory 320. Processor 310 may then iteratively execute the instructions of security server engine 324 to provide the desired method.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. Peripherals may include, by way of non-limiting examples, any of the peripherals disclosed in FIG. 2.

In one example, security server engine 324 includes executable instructions stored on a non-transitory medium operable to perform methods according to this Specification. At an appropriate time, such as upon booting server 140 or upon a command from operating system 322 or a user 120, processor 310 may retrieve a copy of security server engine 324 (or software portions thereof) from storage 350 and load it into memory 320. Processor 310 may then iteratively execute the instructions of security server engine 324.

Machine learning engine 326 may also be configured to provide machine learning algorithms so that server 140 can adapt to a constantly-changing security landscape. In particular, machine learning engine 326 may receive feedback from alleged security events to determine whether they are legitimate security events. For example, if a security event subjects a large number of machines to remediation, and none of them are found to host malware, the event may be analyzed to determine if there was some other exciting cause. Machine learning engine 326 may then store this condition for future reference so that false positives can be avoided. Conversely, if a seemingly-benign security event occurs, but later proves to be symptomatic of a virus outbreak, machine learning engine 326 can be updated with relevant information to better catch future outbreaks.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. In some cases, a peripheral may be a computing device in its own right. Peripherals may include, by way of non-limiting examples, any of the devices discussed in connection with peripheral interface 240 of FIG. 2.

Figure 4:
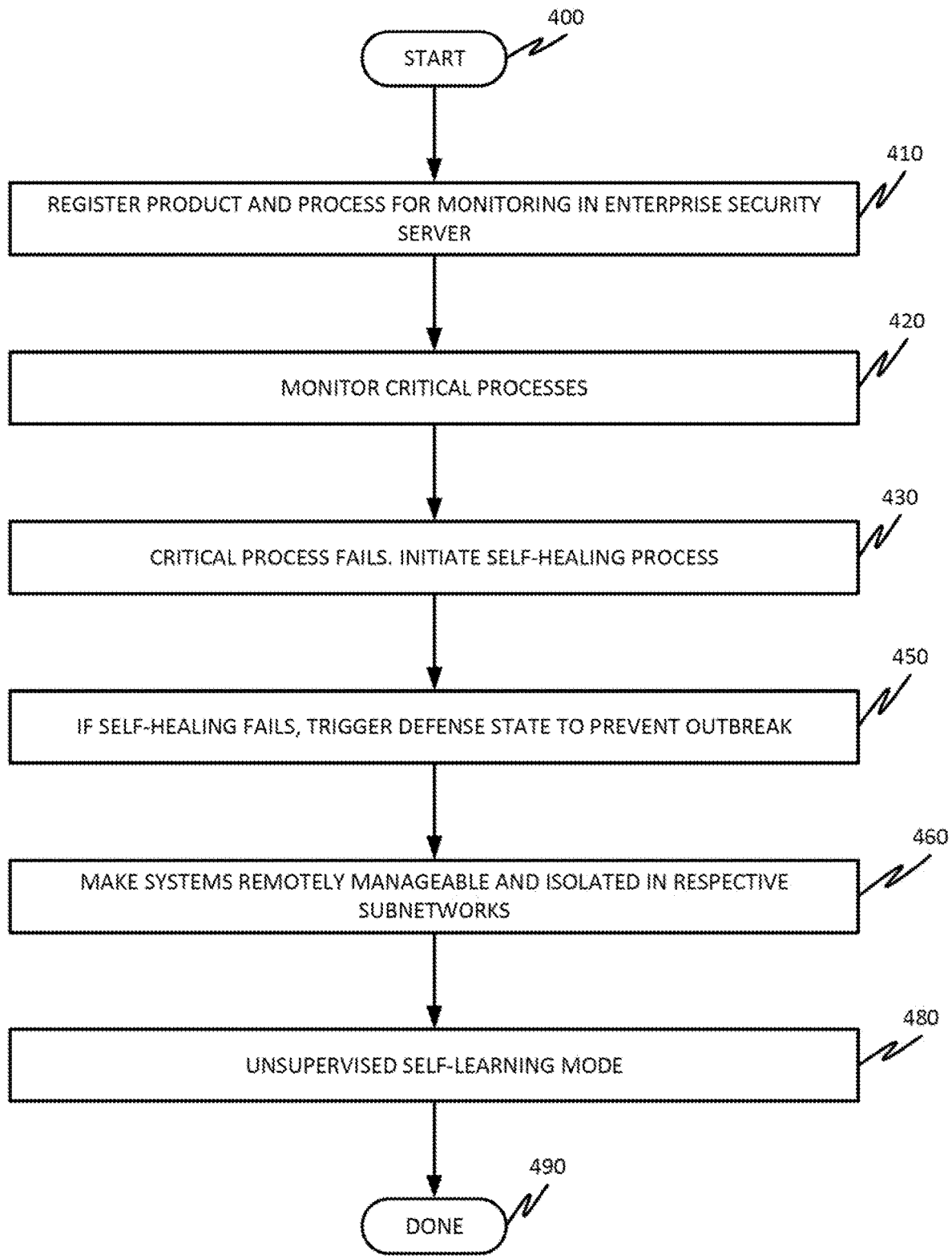
FIG. 4 is a flowchart of a method according to one or more examples of the present Specification.

An example method 400 comprises the following operations, as illustrated in FIG. 4.

In block 410, an interface may be provided to register appropriate processes for monitoring. For example, vPro™ "agent presence" feature may be used to register one or more applications for monitoring.

In certain embodiments, these data may inform security events, as well as providing feedback to machine learning engine 326. This may help to reduce false positives. Data collection may happen at regular interval using telemetry, product events, and product usage pattern within an organization. Self-learning engine 326 may also build application patterns for each monitored system, and compare the application behavior periodically in an unsupervised self-learning mode.

In block 420, out-of-band management agent may monitor critical processes that were registered in block 410. This may further include collecting data about per-process resource consumption, data specific to a particular task, task scheduling, user usage pattern monitoring, and monitoring other processes' interaction with out-of-band management agent 212. Out-of-band management agent 212 may collect data specific to a task, task schedule, user usage pattern, or other processes' interaction with monitoring. These data may be inputs for self-learning engine 326.

In block 430, when any monitored process fails or is forcefully closed by a user or malicious app (optionally as determined by ESC 140), a remedial action may be taken. In certain embodiments:

a. Server-side logic builds application usage patterns and determines whether they represent normal consumption.

b. ESC 140 may take a delta of the environment and try to determine whether the cause of a security event is related to any specific change in environment, such as new product installation, upgrade, etc.).

c. If consumption is legitimate, then based on previous heuristics, allow the process to run for a specific duration. ESC 140 may also generate a system notification for end-user 120 that the monitored process is busy with a particular task, and should release the resources within a specific time frame.

d. If a monitored process is consuming resources above a defined threshold, perform a pre-defined remediation action.

e. If a monitored process is still not stabilizing, then apply the remediation action, including for example a process restart or applying System defense policy on the client.

In block 450, if out-of-band management agent 212 is not able to heal the event (such as through restarting the process), a system defense state may trigger to safeguard the system from outbreaks. This may include in block 460 making the system remotely manageable and isolating the affected system and limiting communication, for example to NFS/UNC server 142 so that it can retrieve and boot from remediation image 148.

If the system is a virtual machine, then hardware monitoring will may happen but the proxy process monitoring services can still monitor and report back the data.

In block 480, after receiving appropriate feedback on security events, self-learning engine 326 may enter an unsupervised self-learning mode.

In one or more embodiments, criteria to trigger a remediation process may include, by way of non-limiting example:

a. Usage of high system resources compare to pre-defined consumption or previous usage pattern.

b. Change of process identifier for a continuous running process.

c. Removal/uninstallation of an application without removing the process monitoring from server.

d. Interrupts and errors from a monitored process.

e. Any system resource leak from a monitored process.

f. Monitoring process is down or not sending heartbeat to agent presence monitor.

In one or more embodiments, remediation actions may include the following, by way of non-limiting example:

a. Reinstalling the application (if removed or corrupt).

b. Re-starting the process.

c. Running diagnostic commands from the server to retrieve all events.
d. Notifying security administrator 150 for issues with mission-critical services.
e. If system is infected then remediating the system using a pre-defined cleaner/rescue image using integrated drive electronics (IDE)-redirection (IDER).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

Example Implementations

There is disclosed in an example, an enterprise security controller comprising: a network interface; and one or more logic elements comprising a security engine operable for: receiving via the network interface a report of a security event from an out-of-band management agent of a client device; and instructing the out-of-band management engine to take a remedial action.

There is further disclosed an example, wherein the security event comprises a crash of a monitored process.

There is further disclosed an example, wherein the security event comprises an error in a monitored process.

There is further disclosed an example, wherein the security event comprises detecting that a monitored process uses excessive system resources.

There is further disclosed an example, wherein the security event comprises detecting a change of process identifier for a monitored.

There is further disclosed an example, wherein the security event comprises detecting removal or uninstallation of a monitored application.

There is further disclosed an example, wherein the security event comprises detecting errors in a monitored process.

There is further disclosed an example, wherein the security event comprises detecting a system resource leak from a monitored process.

There is further disclosed an example, wherein the remedial action comprises causing the out-of-band management agent to boot the client device from a remediation image.

There is further disclosed an example, wherein the remedial action comprises causing the out-of-band management agent to reinstall a monitored application.

There is further disclosed an example, wherein the remedial action comprises causing the out-of-band management agent to restart a monitored process.

There is further disclosed an example, wherein the remedial action comprises causing the out-of-band management agent to run a diagnostic command.

There is further disclosed an example, wherein the remedial action comprises causing the out-of-band management agent to reimage the client device with a clean operating system image.

There is further disclosed in an example, one or more computer-readable mediums having stored thereon executable instructions to instruct a processor to provide a security server engine operable for: receiving via the network interface a report of a security event from an out-of-band management agent of a client device; and instructing the out-of-band management engine to take a remedial action.

There is further disclosed an example, wherein the security event comprises a crash of a monitored process.

There is further disclosed an example, wherein the security event comprises an error in a monitored process.

There is further disclosed an example, wherein the security event comprises detecting that a monitored process uses excessive system resources.

There is further disclosed an example, wherein the security event comprises detecting a change of process identifier for a monitored.

There is further disclosed an example, wherein the security event comprises detecting removal or uninstallation of a monitored application.

There is further disclosed an example, wherein the security event comprises detecting errors in a monitored process.

There is further disclosed an example, wherein the security event comprises detecting a system resource leak from a monitored process.

There is further disclosed an example, wherein the remedial action comprises causing the out-of-band management agent to boot the client device from a remediation image.

There is further disclosed an example, wherein the remedial action comprises causing the out-of-band management agent to reinstall a monitored application.

There is further disclosed in an example, a computing apparatus, comprising: a memory comprising an application to be monitored; and an out-of-band management engine operable for: monitoring the application to be monitored; reporting a security even related to the application to be monitored to a security controller apparatus; receiving instructions for taking a security action; and causing the computing apparatus to take the security action.

There is further disclosed an example, wherein the out-of-band management engine comprises a secure co-processor.

The invention claimed is:

1. An enterprise security controller to provide security to an enterprise, comprising:
   a processor and memory;
   a network interface; and
   executable instructions encoded within the memory to provide a security engine configured to
      receive via the network interface a plurality of reports of security events from a plurality of client devices, the security events indicating that a plurality of malfunctions or crashes of an application has occurred across the plurality of client devices of the enterprise, wherein the application is indicated in a defined security policy;
      perform a determination from the reports that the plurality of malfunctions or crashes occurred within a predetermined time; and
      instruct, based on the determination, at least one of the plurality of client devices to take a remedial action, wherein the remedial action comprises causing the at least one of the plurality of client devices to boot the at least one of the plurality of client devices from a remediation image.

2. The enterprise security controller of claim 1, wherein one of the security events comprises detecting that a monitored process uses excessive system resources.

3. The enterprise security controller of claim 1, wherein one of the security events comprises detecting a change of process identifier for a monitored process.

4. The enterprise security controller of claim 1, wherein one of the security events comprises detecting removal or uninstallation of a monitored application.

5. The enterprise security controller of claim 1, wherein one of the security events comprises detecting a system resource leak from a monitored process.

6. The enterprise security controller of claim 1, wherein the remedial action comprises causing the at least one of the plurality of client devices to reinstall a monitored application.

7. The enterprise security controller of claim 1, wherein the remedial action comprises causing the at least one of the plurality of client devices to restart a monitored process.

8. The enterprise security controller of claim 1, wherein the remedial action comprises causing the at least one of the plurality of client devices to run a diagnostic command.

9. The enterprise security controller of claim 1, wherein the remedial action comprises causing the at least one of the plurality of client devices to reimage the at least one of the plurality of client devices with a clean operating system image.

10. One or more non-transitory, computer-readable mediums having stored thereon executable instructions to instruct a processor to provide a security server engine to provide security to an enterprise, the security server engine configured to:
   receive via a network interface a plurality of reports of security events from a plurality of client devices, the security events indicating that a plurality of malfunctions or crashes of an application has occurred across the plurality of client devices of the enterprise, wherein the application is indicated in a defined security policy;
   perform a determination from the reports that the plurality of malfunctions or crashes has occurred within a designated period; and
   instruct, based on the determination, at least one of the plurality of client devices to take a remedial action, wherein the remedial action comprises causing the at least one of the plurality of client devices to boot the at least one of the plurality of client devices from a remediation image.

11. The one or more computer-readable mediums of claim 10, wherein one of the security events comprises detecting that a monitored process uses excessive system resources.

12. The one or more computer-readable mediums of claim 10, wherein one of the security events comprises detecting a change of process identifier for a monitored process.

13. The one or more computer-readable mediums of claim 10, wherein one of the security events comprises detecting removal or uninstallation of a monitored application.

14. The one or more computer-readable mediums of claim 10, wherein one of the security events comprises detecting an error in a monitored process.

15. The one or more computer-readable mediums of claim 10, wherein one of the security events comprises detecting a system resource leak from a monitored process.

16. The one or more computer-readable mediums of claim 10, further comprising:
   a machine learning engine configured to detect and avoid false positives based on historical data.

17. The enterprise security controller of claim 1, wherein the security engine is further configured to enforce a security policy.

18. The enterprise security controller of claim 1, further comprising:
   a machine learning engine configured to receive feedback to determine whether the at least one of the plurality of client devices hosted malware.

19. The enterprise security controller of claim 1, wherein the remedial action comprises placing at least one of the plurality of client devices in a protected subnetwork.

20. A method, comprising:
   receiving via a network interface a plurality of reports of security events from a plurality of client devices of an enterprise, the security events indicating that a plurality of malfunctions or crashes of an application has occurred across the plurality of client devices, wherein the application is indicated in a defined security policy;
   performing, via a security engine within an enterprise security controller (ESC), a determination from the reports that the plurality of malfunctions or crashes occurred within a predetermined time; and
   instructing, based on the determination, via the security engine, at least one of the plurality of client devices to take a remedial action, wherein the remedial action comprises causing the at least one of the plurality of client devices to boot the at least one of the plurality of client devices from a remediation image.

21. The method of claim 20, wherein one of the security events comprises detecting that a monitored process uses excessive system resources, detecting a change of process identifier for a monitored process, detecting removal or uninstallation of a monitored application, detecting an error in a monitored process, or detecting a system resource leak from a monitored process.

22. The method of claim 20, wherein the remedial action comprises causing the at least one of the plurality of client devices to reinstall a monitored application, causing the at least one of the plurality of client devices to restart a monitored process, causing the at least one of the plurality of client devices to run a diagnostic command, causing the at least one of the plurality of client devices to reimage the at least one of the plurality of client devices with a clean operating system image, or placing at least one of the plurality of client devices in a protected subnetwork.

23. The method of claim 20, further comprising:
 determining, with a machine learning engine, whether the at least one of the plurality of client devices hosted malware, based on received feedback.

\* \* \* \* \*

UNITED STATES PATENT AND TRADEMARK OFFICE
CERTIFICATE OF CORRECTION

PATENT NO. : 11,416,606 B2
APPLICATION NO. : 15/513783
DATED : August 16, 2022
INVENTOR(S) : Shashin Thakur et al.

It is certified that error appears in the above-identified patent and that said Letters Patent is hereby corrected as shown below:

On the Title Page

In Item (72), under "Inventors" Column 1, Line 2, delete "Benagaluru" and insert -- Bengaluru --, therefor.

Signed and Sealed this
Twenty-second Day of August, 2023

Katherine Kelly Vidal
*Director of the United States Patent and Trademark Office*